United States Patent
Sung

(10) Patent No.: US 7,983,364 B2
(45) Date of Patent: Jul. 19, 2011

(54) WIRELESS RECEIVER SUPPORTING MULTIPLE ALGORITHMS AND ALGORITHM SELECTION METHOD THEREOF

(75) Inventor: Joonhyun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 12/073,302

(22) Filed: Mar. 4, 2008

(65) Prior Publication Data

US 2009/0074113 A1    Mar. 19, 2009

(30) Foreign Application Priority Data

Sep. 13, 2007    (KR) .................. 10-2007-0093191

(51) Int. Cl.
    *H04L 27/06*    (2006.01)
    *H03D 1/00*    (2006.01)

(52) U.S. Cl. ........ 375/341; 375/262; 375/231; 375/346; 375/349; 375/232; 455/63.1; 455/133; 455/134; 455/135; 455/296

(58) Field of Classification Search .................. 375/231, 375/340, 341, 346, 349, 350, 229, 232; 455/63.1, 455/133–135, 296
See application file for complete search history.

(56) References Cited

U.S. PATENT DOCUMENTS

| 7,724,816 B2 * | 5/2010 | Chen et al. ................ 375/231 |
| 2005/0044471 A1 | 2/2005 | Chia et al. |
| 2006/0046716 A1 | 3/2006 | Hofstaedter et al. |

FOREIGN PATENT DOCUMENTS

| EP | 1248385 | 10/2002 |
| JP | 2003218968 | 7/2003 |
| KR | 1020050087843 | 8/2005 |
| WO | WO2004017655 | 2/2004 |

* cited by examiner

*Primary Examiner* — Phuong Phu
(74) *Attorney, Agent, or Firm* — NSIP Law

(57) ABSTRACT

Provided is a method of selecting an algorithm in a wireless receiver which supports a plurality of algorithms, more particularly, a method of selecting a suitable algorithm which is adaptive to changes in channel environment and satisfies requirements of applications, using information which is available in the wireless receiver. The algorithm selection method includes: calculating a measure value for selecting an algorithm on the basis of information obtained from the wireless receiver; comparing the measure value with at least one threshold value, and selecting an algorithm that is to be applied to a received packet, from among the plurality of algorithms, according to the result of the comparison; and decoding the received packet using the selected algorithm, wherein the at least one threshold value is adaptively updated on the basis of the information obtained from the wireless receiver.

18 Claims, 8 Drawing Sheets

WIRELESS RECEIVER SUPPORTING MULTIPLE ALGORITHMS AND ALGORITHM SELECTION METHOD THEREOF

CROSS REFERENCE TO RELATED APPLICATIONS

This application claims priority from Korean Patent Application No. 10-2007-0093191, filed on Sep. 13, 2007, the disclosure of which is incorporated herein in its entirety by reference.

BACKGROUND OF THE INVENTION

1. Field of the Invention

The present invention relates to a method for wireless communications, and more particularly, to a wireless receiver supporting multiple algorithms and an algorithm selection method thereof.

2. Description of the Related Art

Communication algorithms that are applied to wireless communication systems are designed to guarantee low performance in regard to economical efficiency according to a predetermined standard, or to guarantee high performance for a given hardware resource. If the structure of a system is simplified in regard to economical efficiency, the system cannot support a high-performance solution, and also cannot exhibit desired performance when a channel state is poor. Meanwhile, if a system is designed to exhibit maximum performance for a given hardware resource, system complexity increases, which makes efficient management of resources difficult.

Since the performance and complexity of an algorithm have a trade-off relationship, there are difficulties in finding a solution which satisfies both performance and complexity.

For example, a Multiple Input Multiple Output (MIMO) detector of a wireless receiver may support both a linear zero forcing detector algorithm having low performance and low complexity and a maximum-likelihood-like detector algorithm having high performance and high complexity. However, in this case, since there are difficulties in finding a solution for satisfying both performance and complexity, a trade-off problem still remains between performance and complexity.

For this reason, a method of selecting an algorithm in which a proper equilibrium between performance and complexity is maintained is required.

SUMMARY OF THE INVENTION

The present invention provides a method of efficiently selecting an algorithm that can maintain a proper equilibrium between performance and complexity and is suitable for a current channel state of a wireless communication system, and a wireless receiver to which the algorithm selection method is applied.

The present invention also provides a simple method of selecting an algorithm, and a wireless receiver to which the simple algorithm selection method is applied.

The present invention discloses a method of selecting a suitable algorithm which is adaptive to changes in a channel environment and satisfies requirements for applications, by using information obtained from the wireless receiver.

According to an aspect of the present invention, there is provided a method of selecting an algorithm in a wireless receiver which supports a plurality of algorithms, the method including: calculating a measure value for selecting an algorithm on the basis of information obtained from the wireless receiver; comparing the measure value with at least one threshold value, and selecting an algorithm that is to be applied to a received packet, from among the plurality of algorithms, according to the result of the comparison; and decoding the received packet using the selected algorithm, wherein the at least one threshold value is adaptively updated on the basis of the information obtained from the wireless receiver.

The algorithm selection method further includes updating the at least one threshold value, using information obtained from the wireless receiver and created from the result of the decoding.

The information obtained from the wireless receiver comprises at least one among a signal-to-noise ratio (SNR), a packet error ratio (PER), a battery state, and a requirement of an application.

Also, the comparing of the measure value with the at least one threshold value includes dividing areas according to the at least one threshold value, and selecting an algorithm corresponding to an area to which the measure value belongs, from among the plurality of algorithms.

The updating of the at least one threshold value includes determining an incremental value or a decremental value with respect to the at least one threshold value on the basis of packet error information which is created from the result of the decoding, and updating the at least one threshold value according to the incremental value or the decremental value.

Performance and complexity of the plurality of algorithms are in a trade-off relationship, and the updating of the at least one threshold value includes maintaining an equilibrium between the performance and the complexity by increasing or decreasing the at least one threshold value, on the basis of packet error information which is created from the result of the decoding, a battery state of the wireless receiver, or a requirement of an application performed by the wireless receiver.

According to another aspect of the present invention, there is provided a wireless receiver supporting a plurality of algorithms, including: a calculator calculating a measure value for selecting an algorithm on the basis of information obtained from the wireless receiver; a selection unit comparing the measure value with at least one threshold value, and selecting an algorithm that is to be applied to a received packet, from among the plurality of algorithms, according to the result of the comparison; and a decoding unit decoding the received packet using the selected algorithm, wherein the at least one threshold value is adaptively updated on the basis of information obtained from the wireless receiver.

The wireless receiver further includes an update unit increasing or decreasing the at least one threshold value, using information which is created from the result of the decoding and is obtained from the wireless receiver.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
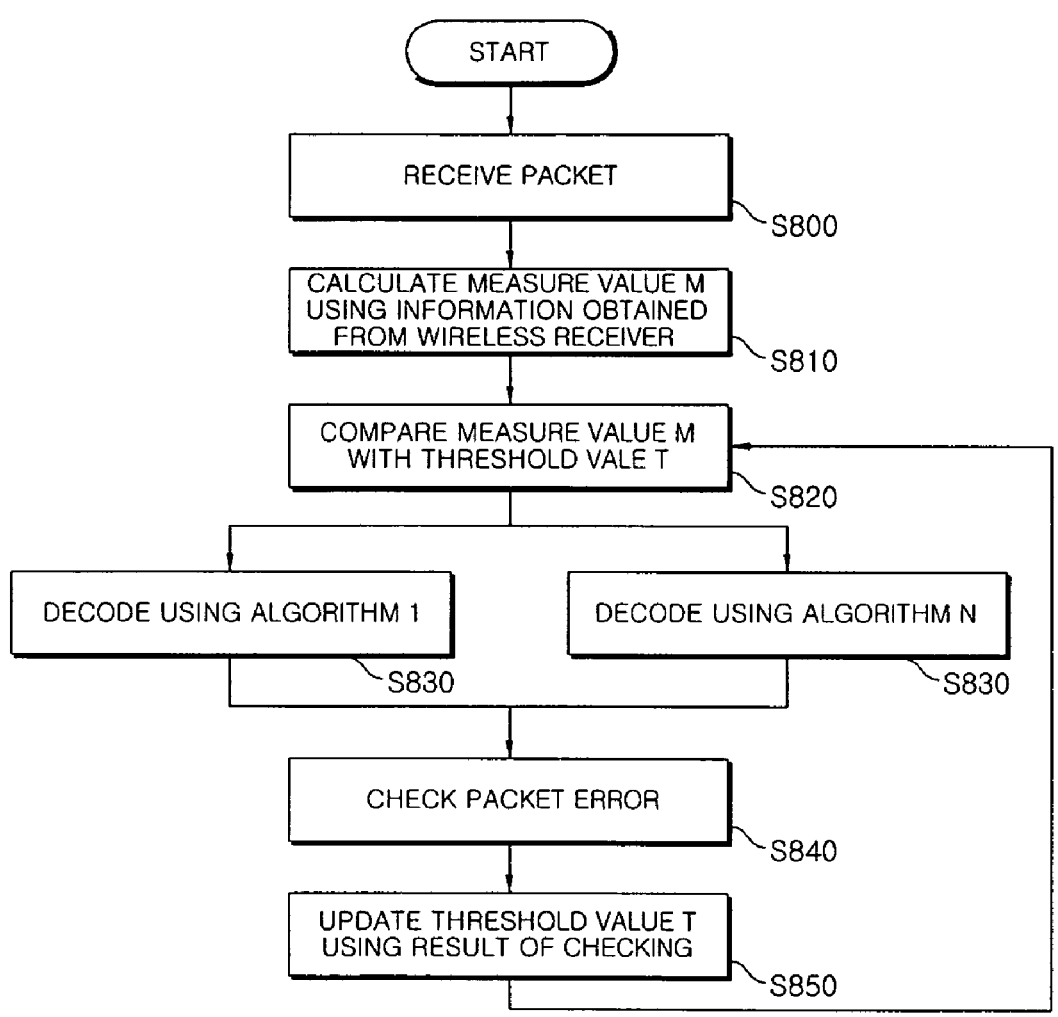
FIG. 1 is a flowchart of an algorithm selection method according to an embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The present invention provides a method of selecting a suitable algorithm using information, such as a signal-to-noise ratio (SNR), a packet error ratio (PER), a battery state, requirements for applications, etc., which can be obtained from a wireless receiver.

The algorithm selection method has to satisfy the following conditions.

First, the algorithm selection method has to be adaptive to changes in a channel environment. That is, a rule for selecting an algorithm has to be changed according to a current channel state.

Second, the algorithm selection method has to be adaptive to the state of the wireless receiver or to the requirements of applications. For example, selecting a high-performance algorithm when a battery is nearly depleted will be excessively wasting resources. However, in the case where an application is executed which is very sensitive to packet errors, selecting a high-performance algorithm will be preferred. As a result, a method of selecting a suitable algorithm which is suitable for the state of the wireless receiver or requirements of applications is needed.

Third, the algorithm selection method itself has to have low complexity. If the algorithm selection method has complexity higher than those of candidate algorithms, it will be useless.

As a result, the present invention proposes a method of selecting an algorithm from among a plurality of algorithms on the basis of information which can be obtained from a wireless receiver, wherein the algorithm selection method (1) is adaptive to changes in channel, (2) satisfies the requirements of the wireless receiver, and (3) has low complexity.

FIG. 1 is a flowchart of an algorithm selection method according to an embodiment of the present invention.

In the following description, it is assumed that the algorithm selection method is applied to a wireless receiver.

Referring to FIG. 1, when the wireless receiver receives a packet (operation S800), the wireless receiver calculates a measure value in which a current state of a channel is reflected in order to select a suitable algorithm (operation S810). In most cases, if the measure value is great, the channel is in a stable state. The measure value may be calculated using information, such as a SNR, a PER, a battery state, requirements for applications, etc., which can be obtained from the wireless receiver.

Then, the wireless receiver compares the measure value with a predetermined threshold value, and based on the result of the comparison finds an area to which the measure value belongs (operation S820). The area is defined by the threshold value. The threshold value is initialized when the wireless receiver is turned on. A method of defining the threshold value will be described in detail later. For example, when two algorithms are supported, a single threshold value is used to select one of the two algorithms.

Then, the wireless receiver decodes the packet using the selected algorithm (operation S830), and the result of the decoding is transmitted to a MAC layer. In the MAC layer, error checking such as a cyclic redundancy check (CRC) is performed on the decoded packet to determine whether the packet is successfully decoded (operation S840).

The wireless receiver updates the threshold value adaptively according to the result of the determination on packet errors (operation S850). Thereafter, the above-described process is repeated in units of a packet or in units of a frame.

Figure 2:
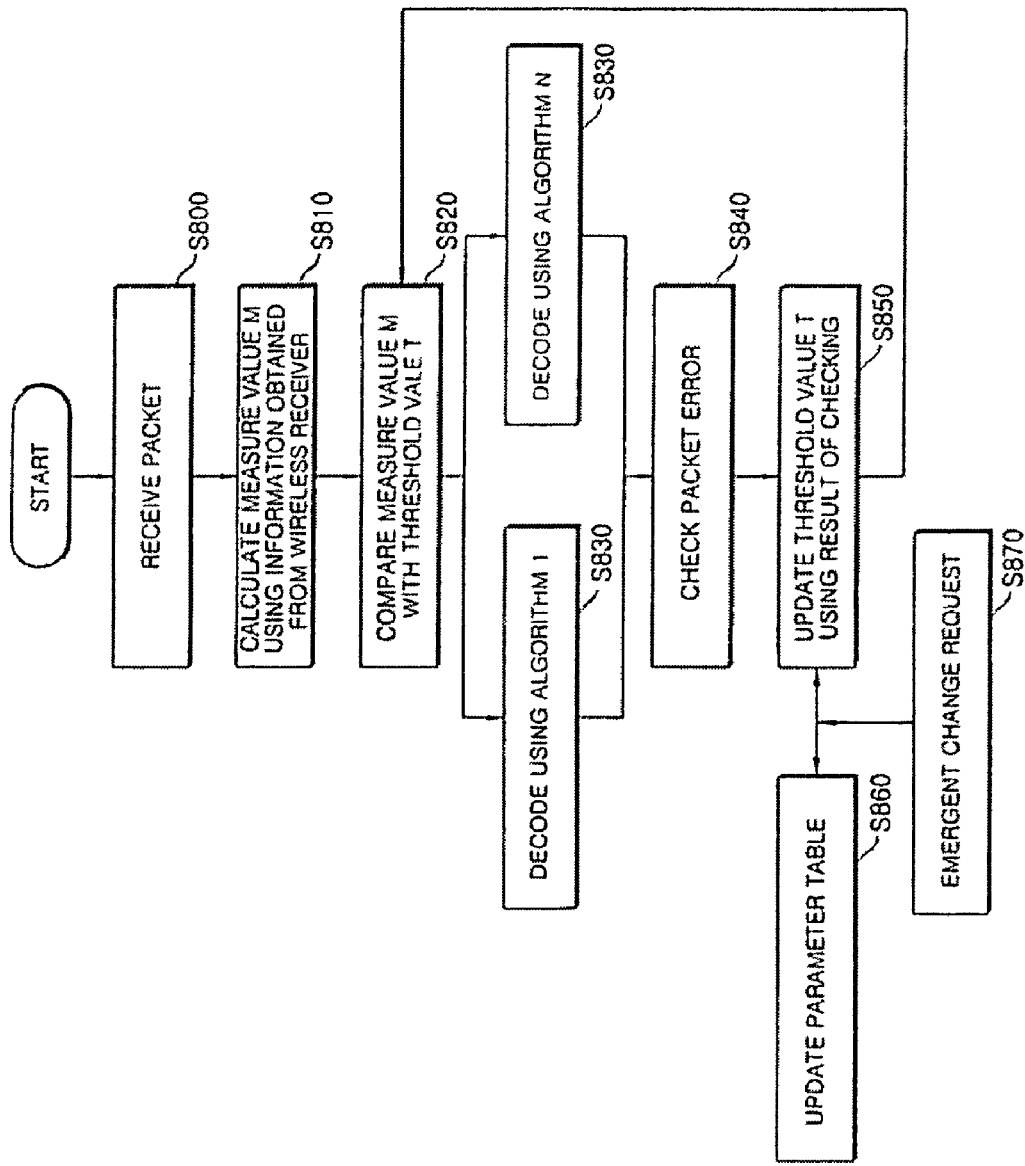
FIG. 2 is a flowchart of an algorithm selection method according to another embodiment of the present invention.

FIG. 2 is a flowchart of an algorithm selection method according to another embodiment of the present invention.

The algorithm selection method illustrated in FIG. 2 is the same as the algorithm selection method illustrated in FIG. 1, except that an update parameter table for adaptively updating a threshold value is utilized (operation S860). In the current embodiment, the update parameter table stores as parameters incremental or decremental values with respect to a threshold value, in order to update the threshold value. Details for the update parameter table will be described later.

Also, in the algorithm selection method illustrated in FIG. 2, when an emergent request is issued from the wireless receiver, the threshold value is updated using an update parameter included in the emergent request, instead of using the update parameter table. For example, when a specific algorithm is urgently requested according to an emergent request, the wireless receiver updates the threshold value according to the emergent request.

Figure 3:
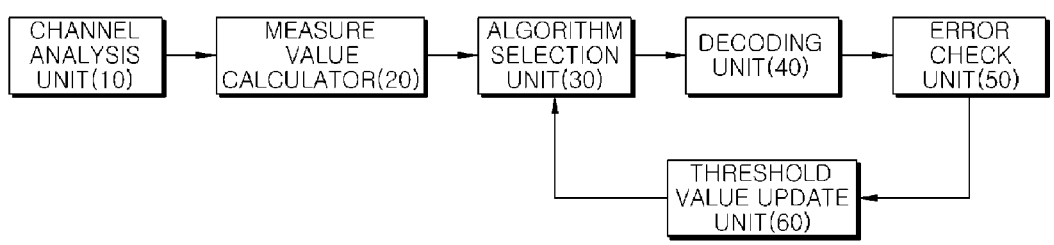
FIG. 3 is a block diagram of a wireless receiver according to an embodiment of the present invention.

FIG. 3 is a block diagram of a wireless receiver according to an embodiment of the present invention.

Referring to FIG. 3, the wireless receiver includes a channel analysis unit 10, a measure value calculator 20, an algorithm selection unit 30, and a decoding unit 40. The wireless receiver can further include an error check unit 50 and a threshold value update unit 60.

The channel analysis unit 10 analyzes a received packet and obtains information about the wireless receiver including information about a current channel state.

The measure value calculator 20 calculates a measure value for selecting an algorithm, on the basis of information obtained from the wireless receiver. The measure value will be described in further detail later.

The algorithm selection unit 30 compares the measure value with at least one threshold value, and selects an algorithm that is to be applied to the received packet, from among a plurality of algorithms.

The decoding unit 40 decodes the received packet using the selected algorithm. The error check unit 50 checks information about packet errors according to the result of the decoding.

The threshold value update unit 60 updates the threshold value by a predetermined incremental value or by a predetermined decremental value, on the basis of the information about packet errors. Here, the threshold value may be updated adaptively on the basis of the information obtained from the wireless receiver.

Hereinafter, the algorithm selection method according to the embodiment of the present invention illustrated in FIG. 2 will be described in detail on the basis of the wireless receiver described above.

Figure 4:
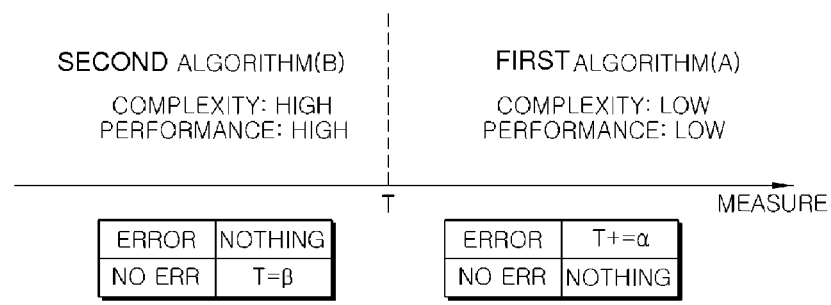
FIGS. 4, 5, and 6 are views for explaining the algorithm selection method according to the embodiment of the present invention illustrated in FIG. 2.
Figure 5:
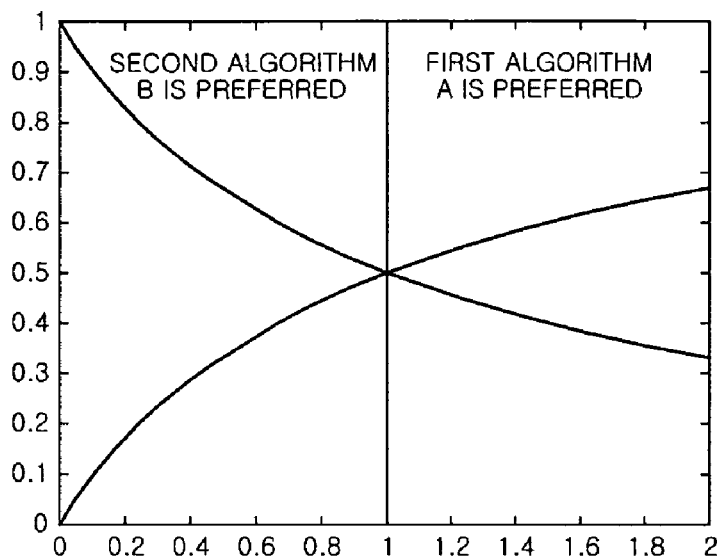
Figure 6:
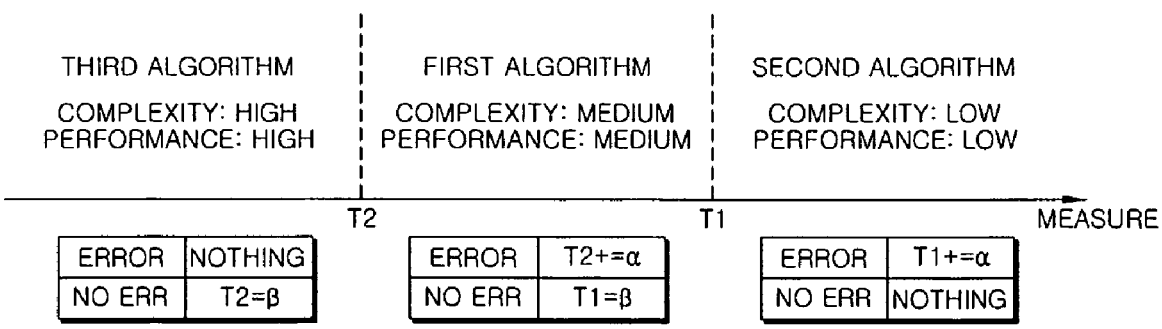

FIGS. 4, 5, and 6 are views for explaining the algorithm selection method according to the embodiment of the present invention illustrated in FIG. 2.

First, FIG. 4 is a view for explaining a method of selecting an algorithm to perform a task when two algorithms are supported. That is, by comparing a measure value M for selecting an algorithm with a threshold value T, a suitable algorithm can be easily selected.

For example, it is assumed that the wireless receiver supports a first algorithm A and a second algorithm B for performing a task. Also, it is assumed that the first algorithm A has low performance but low complexity, and the second algorithm B has high performance but high complexity. When the measure value M is greater than the threshold value T, that is, when a current channel state is good, using the first algorithm A having low complexity, instead of using the second algorithm B having high complexity, is preferred. Meanwhile, when the current channel state is poor, by using the second algorithm B having high performance instead of using the first algorithm A having a high probability of generating packet errors, a received packet can be more successfully decoded.

Referring to FIG. 4, if M>T, the first algorithm A having low performance and low complexity is selected, and if M<T, the second algorithm B having high performance and high complexity is selected.

Meanwhile, the threshold value T is updated adaptively on the basis of information about packet errors, which is obtained from the result of decoding. In the case where the first algorithm A having low performance is selected, if a packet error is generated when a received packet is decoded using the first algorithm A, the threshold value T increases by a predetermined incremental value a. This is aimed at increasing a probability of selecting the second algorithm B having high performance. If no packet error is generated when the received packet is decoded using the first algorithm A, the threshold value T does not need to be updated.

Meanwhile, in the case where the second algorithm B having high performance is selected, if no packet error is generated when a received packet is decoded using the second algorithm B, the threshold value T decreases by a predetermined decremental value β. This is aimed at decreasing a probability of selecting the second algorithm B having high performance in order to reduce complexity. If a packet error is generated when the received packet is decoded using the second algorithm B, the threshold value T does not need to be updated. As such, the process of updating the threshold value T as illustrated in the tables of FIG. 4 depends on results obtained by decoding a received packet using an algorithm which is selected by the algorithm selection method according to the embodiment of the present invention.

The algorithm selection method according to the present invention can be expressed by equation 1 below.

If it is assumed that a PER of when the first algorithm A is utilized is $p_1$ and a PER of when the second algorithm B is utilized is $p_2$, a probability that the threshold value T increases by the predetermined incremental value $\alpha$ is $p_1 P_r|M>T|$, and also, a probability that the threshold value T decreases by the predetermined decremental value $\beta$ is $(1-p_2)P_r|M<T|$. Here, $P_r|M>T|$ represents a probability that the first algorithm A having low performance is selected, and $P_r|M<T|$ represents a probability that the second algorithm B having high performance is selected. Updating the threshold value T is a process of adjusting the update parameters $\alpha$ and $\beta$ (also, referred to as incremental and decremental values) so that $\alpha p_1 P_r|M>T|=\beta(1-p_2)P_r|M<T|$ is satisfied, that is, so that an equilibrium between performance and complexity is maintained. An equilibrium equation 1 used for this process can be expressed below.

$$\frac{Pr|M > T|}{Pr|M < T|} = \frac{\beta(1 - p_2)}{\alpha p_1} = c, \qquad (1)$$

where the probability that the first algorithm A having low performance is selected is $$Pr|M > T| = \frac{c}{(1 + c)},$$

and the probability that the second algorithm B having high performance is selected is $$Pr|M < T| = \frac{c}{(1 + c)}.$$

FIG. 5 is a graph showing probabilities that the first and second algorithms A and B are selected, with respect to a convergence value c. Referring to FIG. 5, if c>1, the first algorithm A having low performance is preferred, and if c<1, the second algorithm B having high performance is preferred.

Meanwhile, the algorithm selection method according to the embodiment of the present invention can control the convergence value c of the threshold value T when the threshold value T is updated. Accordingly, the wireless receiver according to the embodiment of the present invention can control the threshold value T according to the state of the wireless receiver or requirements for applications. This can be applied to a case of having to save power when the battery of the wireless receiver is nearly depleted or a case where an application performed by the wireless receiver requires a low PER.

When the battery of the wireless receiver is nearly depleted, it is preferable to increase the probability of selecting the first algorithm A having low performance. When an application requires reduction of a PER, for example, when an important packet is processed, it is preferable to increase the probability of selecting the second algorithm B having high performance.

Here, update parameters that can be controlled by the wireless receiver are $\alpha$ and $\beta$, and, as seen in Equation 1, the PERs $p_1$ and $p_2$ of the first and second algorithms A and B are influenced by the convergence value c. If it is assumed that the PER $p_2$ of the second algorithm B is sufficiently small, actually, because the second algorithm B has high performance even if having high complexity, and thus has a very low PER, the following Equation 2 can be induced from Equation 1, and the wireless receiver can obtain the update parameter $\beta$ using Equation 2.

$$\beta \approx \alpha c p_1 \qquad (2)$$

For example, if the first and second algorithms A and B have to be selected with the same probability, the wireless receiver can set c=1 with respect to all SNRs.

If the update parameter α is great, the threshold value T may be rapidly converged or sharply fluctuated. Conversely, if the update parameter α is small, the threshold value T may be too slowly converged. Therefore, it is not preferable that the update parameter α is set to a very great value or to a very small value. Instead, it is preferable to set the update parameter α to a constant. As a SNR of the wireless receiver increases, the PER $p_1$ of the first algorithm A decreases exponentially, and accordingly, the update parameter β has to decrease exponentially with respect to the constant α.

In another example for controlling the convergence value c of the threshold value T when updating the threshold value T, if a PER has to be maintained low at a high SNR as well as at a low SNR, the first algorithm A is enough for this.

In this case, the update parameters α and β can be set to constants. Accordingly, as a SNR increases, the convergence value $$c \approx \frac{\beta}{\alpha p_1}$$

increases, which means that the first algorithm A is preferred at a high SNR.

Generally, in order to obtain combinations of update parameters α and β for various modulations and codings, an update parameter table which is created through an offline test is used. However, if an emergent request for changing a selection preference for a specific algorithm on the basis of the state of the wireless receiver is issued, the update parameters α and β can be compulsorily set to predetermined values. For example, when the battery of the wireless receiver is nearly depleted, the first algorithm A having low performance and low complexity is preferred, and the update parameter β is reduced according to Equation 3 in order to correspondingly change the threshold value T.

$$\beta = \beta \cdot r^n, \quad (3)$$

where n represents a degree at which the threshold value T is reduced, and r (r>1) is a parameter value to adjust a degree at which the threshold value T changes. For example, r=10. The update parameter β increases exponentially by n until it reaches the update parameter α.

Meanwhile, when an emergent request for reducing a PER is issued to process an important packet, the second algorithm B having high performance and high complexity is preferred, and the update parameter β increases exponentially to correspondingly change the threshold value T, according to Equation 4.

$$\beta = \beta / r^n, \quad (4)$$

where n represents a degree at which the threshold value increases.

The emergent request has a priority higher than that of the update parameter table. In order to perform the corresponding operation in response to the emergent request, an update parameter β calculated according to Equation 3 or 4 is used. If the emergent situation is released, the update parameters α and β are set to the previous values so that the threshold value T returns to its original value.

Heretofore, a method of selecting an algorithm in a wireless receiver which supports two algorithms has been described. However, the present invention can also be applied to a wireless receiver which supports three or more algorithms.

For example, FIG. 6 is a view for explaining a method of updating a threshold value and selecting an algorithm, according to an embodiment of the present invention, when a wireless receiver supports three algorithms (hereinafter, referred to as first, second, and third algorithms). When a wireless receiver supports three algorithms, two threshold values are used to select a suitable algorithm from among the three algorithms, and the threshold values are updated on the basis of the number of packet errors. An update parameter which is used to select the second algorithm or the third algorithm may be different from an update parameter which is used to select the first algorithm or the second algorithm.

Hereinafter, simulation results obtained when the algorithm selection method according to the embodiment of the present invention is applied to a wireless receiver which supports two Multiple Input Multiple Output (MIMO) detection algorithms will be described. FIGS. 7 through 11 are views for explaining simulation results of the algorithm selection method according to the embodiment of the present invention illustrated in FIG. 2.

Figure 7:
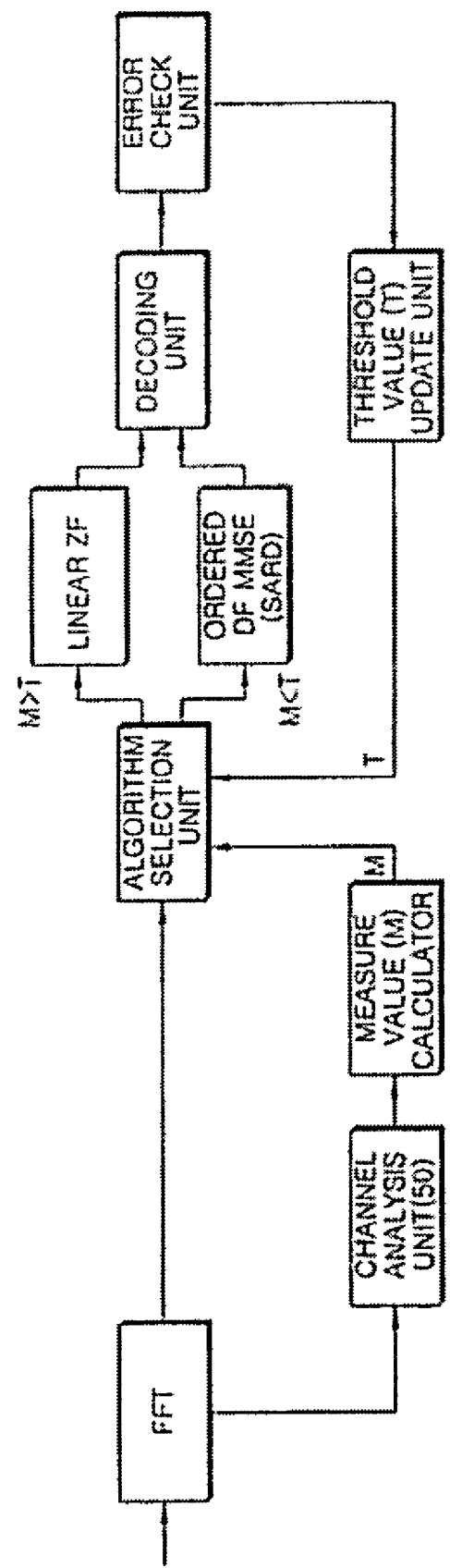
FIGS. 7 through 10 are views for explaining simulation results of the algorithm selection method according to the embodiment of the present invention illustrated in FIG. 2.

First, FIG. 7 is a block diagram of a wireless receiver which supports two MIMO detection algorithms. The wireless receiver illustrated in FIG. 7, which supports two MIMO detection algorithms, is used for simulation. In the wireless receiver, two transmitting antennas and two receiving antennas, which are based on the IEEE 801.11n, are used, and data is spatially multiplexed into two streams. One (a first algorithm) of the two MIMO detection algorithms is a zero-forcing (ZF) algorithm which is one of simplest detection algorithms, and the other (a second algorithm) of the two MIMO detection algorithms is a minimum-mean-squared-error (MMSE) detection algorithm using odering. The second algorithm is more efficient by about 5 db than the first algorithm.

Another important problem for simulation is to select a proper measure value. A proper measure value is a value for selecting the first algorithm having low performance when no packet error is found in the result of decoding by the first algorithm, and selecting the second algorithm when the first algorithm fails to decode. An ideal measure value will be a value which can minimize complexity while obtaining maximum performance (the second algorithm). However, unfortunately, it is difficult to find an ideal measure value for selecting an algorithm.

According to an embodiment of the present invention, a general measure value for selecting an algorithm, which can be estimated from a pilot signal, is obtained by using a received SNR value. The IEEE 802.11n adopts an OFDM system, and a received SNR is an average of sub-carriers and can be expressed by Equation 5.

$$M = 10\log_{10}\left(\sum_{subcarriers} \frac{(|H_{11}|^2 + |H_{12}|^2 + |H_{21}|^2 + |H_{22}|^2)}{2N_0}\right), \quad (5)$$

where it is assumed that QAM signals are normalized signals. In Equation 5, $H_{ij}$ represents a channel-estimated value of each sub-carrier, and $N_0$ represents noise. A measure value for selecting an algorithm, according to an embodiment of the present invention, can be used to select a MIMO algorithm or any other algorithm when data is received.

Figure 8:
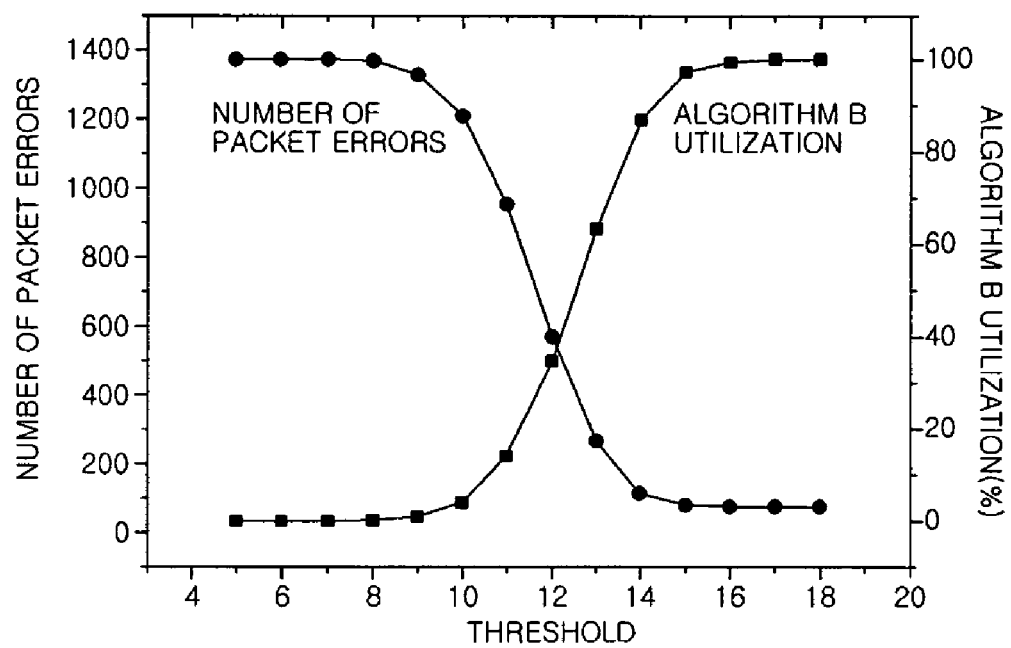

FIG. 8 shows a utilization rate of the second algorithm with respect to the number of packet errors and threshold values. In FIG. 8, the threshold values are assumed as constants, and a measure value is calculated using Equation 5. In order to obtain a flat threshold value with respect to all packets, updating the threshold values will be omitted.

Referring to FIG. 8, threshold values T from 4 to 18 are used when an average SNR for 10000 packets is 15 db. When only the second algorithm B is utilized, performance is best because the number of packet errors is 72. Also, when only the first algorithm A is utilized, performance is worst because the number of packet errors is 1370. When the threshold value is reduced below 15, the number of packet errors increase sharply, and the utilization rate of the second algorithm B having high performance is also sharply reduced. The utilization rate of the second algorithm B and the number of packet errors are converged to limited values from when the threshold value approaches 9. When the utilization ratio of the second algorithm B is 40%, the number of packet errors becomes about 500.

Meanwhile, according to another embodiment of the present invention, a general measure value for selecting an algorithm, which can be estimated from a pilot signal, is obtained by using a threshold value of the norm of a row vector. In order to obtain a measure value better than in Equation 5, Equation 6 can be utilized.

$$M = \sum_{subcarriers} \frac{1}{2} \left[ 10\log_{10}\left(\frac{1}{(|C_{11}|^2 + |C_{12}|^2)N_0}\right) + 10\log_{10}\left(\frac{1}{(|C_{11}|^2 + |C_{12}|^2)N_0}\right) \right], \quad (6)$$

where $C_{ij}$ represents a component of a zero-forcing filter, and a threshold value of the norm of a row vector is used as a measure value.

Figure 9:
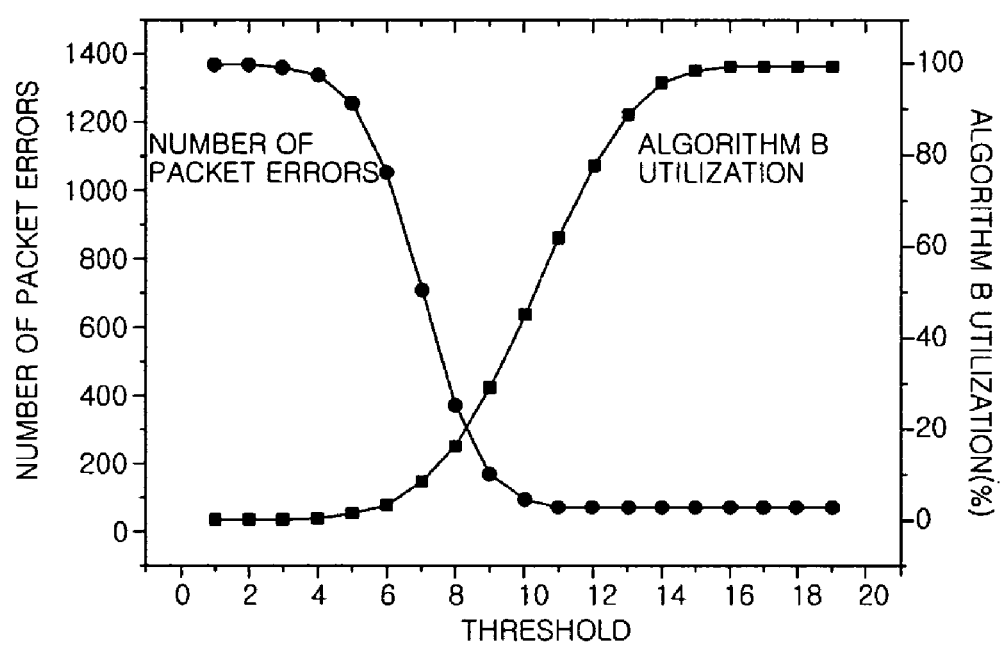

FIG. 9 shows the number of packet errors and a utilization rate of the second algorithm B having high performance when a measure value obtained according to Equation 6 is used.

Referring to FIG. 9, the utilization rate of the second algorithm B having high performance is reduced sharply when a threshold value decreases below 14. Meanwhile, the number of packet errors is little increased until the threshold value reaches 10. Accordingly, if the threshold value is set between 14 and 10, the number of packet errors approximates a lowest limit, and complexity can be reduced because the utilization rate of the second algorithm B having high performance is decreased from 87% to 46%. When the utilization rate of the second algorithm B is 40%, the number of packet errors is only 120. Comparing the number 120 of packet errors with the number 500 of packet errors which appears when Equation 5 is used, a measure value M calculated by Equation 6 has packet errors less than that calculated by Equation 5.

Figure 10:
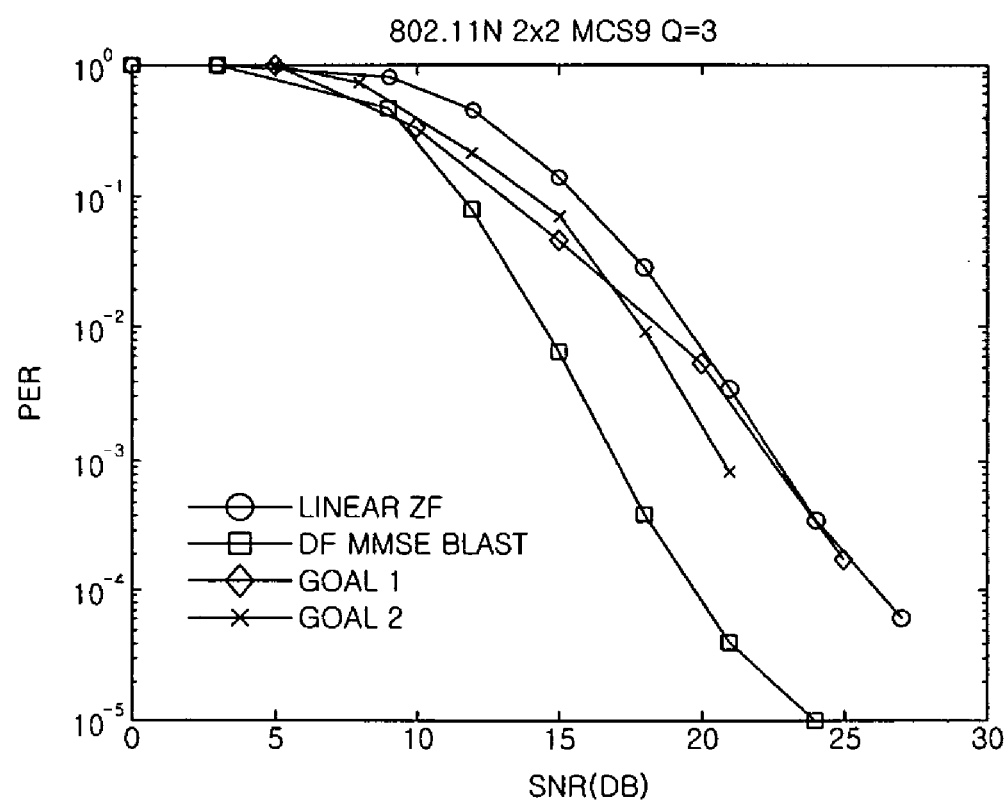

FIG. 10 is a graph plotting a PER with respect to a SNR, according to an embodiment of the present invention.

In FIG. 10, the highest and lowest limits of the number of packet errors which appear when the first algorithm A (linear ZF) and the second algorithm B (DF MMSE BLAST) are respectively utilized are shown. A curve denoted by "x" corresponds to a case where a threshold value is updated so that a PER becomes an average of a PER of when the first algorithm A is utilized and a PER of when the second algorithm B is utilized.

Meanwhile, the second algorithm B is preferred when a SNR is low, and the first algorithm A is preferred when a SNR is high. A curve denoted by " ◊ " represents a PER curve when the algorithm selection method according to the embodiment of the present invention is used. The present invention has the following two objects.

One (referred to as a first object) of the two objects is to maintain the utilization ratio of the second algorithm B to a constant value with respect to all SNRs, and the other one (referred to as a second object) of the two objects is to control update parameters so that a utilization ratio of the second algorithm B increases at a low SNR, that is, in a good channel state, and decreases at a high SNR, that is, in a poor channel state. In order to achieve the objects, combinations of update parameters α and β are used. In order to maintain the utilization ratio of the second algorithm B having high performance to a constant value with respect to all SNRs, Table 1 can be used.

According to Table 1, a PER curve is located between a PER curve obtained when the first algorithm A is utilized and a PER curve obtained when the second algorithm B is utilized.

TABLE 1

| SNR | α | β |
|---|---|---|
| 6 | 0.05 | 0.25 |
| 9 | 0.05 | 0.03 |
| 12 | 0.05 | 0.02 |
| 15 | 0.05 | 0.015 |
| 18 | 0.05 | 0.0015 |
| 21 | 0.05 | 0.00015 |

In order to achieve the second object, a=0.1 and b=0.01 are used. Referring to FIG. 10, the PER curve according to the embodiment of the present invention approximates the PER curve obtained by the second algorithm B when a SNR is low, that is, when a channel environment is good, but, approximates the PER curve obtained by the first algorithm A when a SNR is high, that is, when a channel environment is poor.

As described above, performance and complexity of a plurality of algorithms which are supported by a wireless receiver are in a trade-off relationship, and a wireless receiver according to the embodiment of the present invention increases or decreases a threshold value by a predetermined incremental value or by a predetermined decremental value, on the basis of packet error information (PER), the state of the battery of the wireless receiver, or requirements for applications performed by the wireless receiver, which are obtained by decoding a received packet using an algorithm selected through comparison between a measure value and the threshold value, thereby maintaining an equilibrium between performance and complexity which are in the trade-off relationship.

According to the simulation results, the algorithm selection method according to the embodiment of the present invention could have significantly reduced complexity by only a little increasing the number of packet errors. That is, in the case of a MIMO system, while a PER has increased by only 3.7%, the complexity of an algorithm has been reduced by about 40%.

Further, the algorithm selection method according to the embodiment of the present invention can be applied to systems which support a plurality of solutions. That is, the embodiment of the present invention has been described by using as an example a wireless receiver which supports two or more MIMO detection algorithms. However, the present invention is not limited to the MIMO detection algorithm, and can be applied to a wireless receiver which supports a plurality of algorithms which are classified according to the number of repetitions of Turbo decoding or Low Density Parity Check (LDPC) decoding, or to a wireless receiver which supports a plurality of algorithms which are classified according to the number of quantization bits of a soft input in Viterbi decoding.

As described above, there is provided a method of efficiently selecting an algorithm that can maintain a proper equilibrium between performance and complexity and is suitable for a current channel state, in a wireless receiver supporting a plurality of algorithms, and a wireless receiver to which the algorithm selection method is applied.

That is, by calculating a measure value for selecting an algorithm suitable for a currently received packet, and comparing the measure value with a threshold value, a suitable algorithm can be easily selected.

Also, there is provided a method of selecting a suitable algorithm which is adaptive to changes in a channel environment and satisfies requirements for applications, by updating a threshold value adaptively on the basis of information obtained from the wireless receiver.

Furthermore, a system designer can control a utilization ratio of an algorithm according to desired performance.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of selecting an algorithm in a wireless receiver which supports a plurality of algorithms, the method comprising:
   calculating a measure value for selecting an algorithm on the basis of information obtained from the wireless receiver;
   comparing the measure value with at least one threshold value, and selecting an algorithm that is to be applied to a received packet, from among the plurality of algorithms, according to the result of the comparison;
   decoding the received packet using the selected algorithm; and
   updating the at least one threshold value, using information obtained from the wireless receiver and created from the result of the decoding,
   wherein the at least one threshold value is adaptively updated on the basis of the information obtained from the wireless receiver.

2. The method of claim 1, wherein the information obtained from the wireless receiver comprises at least one of a signal-to-noise ratio (SNR), a packet error ratio (PER), a battery state, and a requirement of an application.

3. The method of claim 1, wherein the comparing of the measure value with the at least one threshold value comprises dividing areas according to the at least one threshold value, and selecting an algorithm corresponding to an area to which the measure value belongs, from among the plurality of algorithms.

4. The method of claim 1, wherein the updating of the at least one threshold value comprises determining an incremental value or a decremental value with respect to the at least one threshold value on the basis of packet error information which is created from the result of the decoding, and updating the at least one threshold value according to the incremental value or the decremental value.

5. The method of claim 1, wherein the updating of the at least one threshold value comprises determining an incremental value or a decremental value with respect to the at least one threshold value on the basis of a battery state of the wireless receiver, and updating the at least one threshold value according to the incremental value or the decremental value.

6. The method of claim 1, wherein the updating of the at least one threshold value comprises determining an incremental value or a decremental value with respect to the at least one threshold value on the basis of a requirement of an application performed by the wireless receiver, and updating the at least one threshold value according to the incremental value or the decremental value.

7. The method of claim 1, wherein performance and complexity of the plurality of algorithms are in a trade-off relationship, and the updating of the at least one threshold value comprises maintaining an equilibrium between the performance and the complexity by increasing or decreasing the at least one threshold value, on the basis of packet error information which is created from the result of the decoding, a battery state of the wireless receiver, or a requirement of an application performed by the wireless receiver.

8. The method of claim 1, wherein the plurality of algorithms include a Multiple Input Multiple Output (MIMO) detection algorithm.

9. The method of claim 1, wherein the plurality of algorithms are classified according to the number of iteration of Turbo decoding or Low Density Parity Check (LDPC) decoding.

10. The method of claim 1, wherein the plurality of algorithms are classified according to the number of quantization bits of a soft input in Viterbi decoding.

11. A wireless receiver supporting a plurality of algorithms, the wireless receiver comprising:
    a calculator calculating a measure value for selecting an algorithm on the basis of information obtained from the wireless receiver;
    a selection unit comparing the measure value with at least one threshold value, and selecting an algorithm that is to be applied to a received packet, from among the plurality of algorithms, according to the result of the comparison;
    a decoding unit decoding the received packet using the selected algorithm; and
    an update unit increasing or decreasing the at least one threshold value, using information which is created from the result of the decoding and is obtained from the wireless receiver,
    wherein the at least one threshold value is adaptively updated on the basis of information obtained from the wireless receiver.

12. The wireless receiver of claim 11, wherein the information obtained from the wireless receiver comprises at least one among a signal-to-noise ratio (SNR), a packet error ratio (PER), a battery state, and a requirement of an application.

13. The wireless receiver of claim 11, wherein the selection unit divides areas according to the at least one threshold value, and selects an algorithm corresponding to an area to which the measure value belongs.

14. The wireless receiver of claim 11, wherein the update unit determines an incremental value or a decremental value with respect to the at least one threshold value on the basis of packet error information which is created from the result of the decoding, and updates the at least one threshold value according to the incremental value or the decremental value.

15. The wireless receiver of claim 11, wherein the update unit determines an incremental value or a decremental value of the at least one threshold value, on the basis of a battery state of the wireless receiver, and updates the at least one threshold value according to the incremental value or the decremental value.

16. The wireless receiver of claim 11, wherein the update unit determines an incremental value or a decremental value with respect to the at least one threshold value, on the basis of a requirement of an application performed by the wireless receiver, and updates the at least one threshold value according to the incremental value or the decremental value.

17. The wireless receiver of claim 11, wherein the plurality of algorithms include a Multiple Input Multiple Output (MIMO) detection algorithm.

18. The wireless receiver of claim 11, wherein the plurality of algorithms are classified according to the number of iteration of Turbo decoding or Low Density Parity Check (LDPC) decoding.

* * * * *